(12) United States Patent
Takita

(10) Patent No.: US 11,876,934 B2
(45) Date of Patent: Jan. 16, 2024

(54) IMAGE READING APPARATUS FOR DETECTING MULTIFEEDING AN INTERRUPTING OR STOPPING THE READING, AND IMAGE READING METHOD

(71) Applicant: Seiko Epson Corporation, Tokyo (JP)

(72) Inventor: Kazuya Takita, Shimonoseki (JP)

(73) Assignee: Seiko Epson Corporation, Tokyo (JP)

( * ) Notice: Subject to any disclaimer, the term of this patent is extended or adjusted under 35 U.S.C. 154(b) by 158 days.

(21) Appl. No.: 17/650,142

(22) Filed: Feb. 7, 2022

(65) Prior Publication Data

US 2022/0256041 A1 Aug. 11, 2022

(30) Foreign Application Priority Data

Feb. 9, 2021 (JP) .................................. 2021-018867

(51) Int. Cl.
*H04N 1/00* (2006.01)

(52) U.S. Cl.
CPC ..... *H04N 1/00013* (2013.01); *H04N 1/00037* (2013.01); *H04N 1/00657* (2013.01); *H04N 1/00737* (2013.01); *H04N 1/00745* (2013.01); *H04N 1/00771* (2013.01); *H04N 1/00777* (2013.01); *H04N 1/00811* (2013.01); *H04N 1/00824* (2013.01)

(58) Field of Classification Search
CPC ........... H04N 1/00013; H04N 1/00037; H04N 1/00657; H04N 1/00737; H04N 1/00745; H04N 1/00771; H04N 1/00777; H04N 1/00811; H04N 1/00824
USPC ................................ 358/1.1–1.18, 474, 498
See application file for complete search history.

(56) References Cited

U.S. PATENT DOCUMENTS

| | | | | |
|---|---|---|---|---|
| 11,523,005 | B2* | 12/2022 | Matsuyama | ....... H04N 1/00814 |
| 2012/0314267 | A1* | 12/2012 | Suzuki | ................. B65H 3/5261 |
| | | | | 271/10.03 |
| 2019/0281182 | A1* | 9/2019 | Kanaya | .................. G06V 10/50 |
| 2020/0204695 | A1 | 6/2020 | Sakai | |
| 2020/0324991 | A1* | 10/2020 | Nakamura | ............... B65H 3/06 |
| 2021/0250459 | A1* | 8/2021 | Akagi | ................ H04N 1/00734 |
| 2022/0033209 | A1* | 2/2022 | Fukumitsu | ........... B65H 3/0669 |

FOREIGN PATENT DOCUMENTS

| | | |
|---|---|---|
| JP | 2018-195960 | 12/2018 |
| JP | 2020-100459 | 7/2020 |

* cited by examiner

*Primary Examiner* — Gabriel I Garcia
(74) *Attorney, Agent, or Firm* — WORKMAN NYDEGGER

(57) ABSTRACT

A reading unit is configured to capture an image of a shadow generated at a leading end of a document, and a control unit is configured to estimate a thickness of the document based on a pixel value of the shadow. A multifeeding error is displayed on a display unit when it is determined as thin paper in a thick paper determination. The control unit turns multifeeding detection to OFF and stands by until a feeding is completed, and upon completion, returns the multifeeding detection to ON.

13 Claims, 6 Drawing Sheets

IMAGE READING APPARATUS FOR DETECTING MULTIFEEDING AN INTERRUPTING OR STOPPING THE READING, AND IMAGE READING METHOD

The present application is based on, and claims priority from JP Application Serial Number 2021-018867, filed Feb. 9, 2021, the disclosure of which is hereby incorporated by reference herein in its entirety.

BACKGROUND

1. Technical Field

The present disclosure relates to an image reading apparatus and an image reading method.

2. Related Art

A document scanner transports one by one a document set at an ADF to a reading unit, and performs reading of the document. A plurality of the documents may be simultaneously supplied from the ADF contrary to the intention, which is referred to as multifeeding. It is not possible to read the document that is to be read when multifeeding occurs, thus it is necessary to detect the multifeeding and interrupt or stop the reading.

A ultrasonic wave sensor may be used to detect multifeeding. When the ultrasonic wave sensor is installed on a transportation path of the document, a transmission attenuation amount of ultrasonic waves at the time when the plurality of the documents pass becomes greater than a transmission attenuation amount of the ultrasonic waves when a single document passes, which makes it possible to detect the transmission attenuation amount and to detect multifeeding.

However, thick paper, even when this is a single piece, may be erroneously detected as multifeeding due to a large transmission attenuation amount. When stopped due to the erroneous detection of multifeeding, the user need to perform operation for continued processing. The same applies to a case where thick paper and thin paper are both present. Alternatively, an operation of turning off in advance a function of multifeeding detection is required.

Here, JP 2020-100459 A and JP 2018-195960 A are known as disclosing a technology for detecting as thick paper.

In the technology disclosed in JP 2020-100459 A, the shape of the read document is recognized, assuming thick paper having a specified shape such as a credit card, and in case of the specified shape, a processing will be performed that is not for multifeeding.

Also, in the technology described in JP 2018-195960 A, a shadow, generated at the edge of the document, corresponding to the thickness of paper is recognized as an image, and the thickness is estimated based on the image of the shadow.

In the case of the technology described in JP 2020-100459 A, the entirety of the document needs to be read in order to recognize the shape of the document, resulting in a retardation of the timing for reflecting the thickness.

In the case of the technology described in JP 2018-195960 A, it is impossible, even when the thickness could be detected, to immediately prevent the erroneous detection of multifeeding.

The present disclosure is for detecting thick paper in an early timing to prevent the erroneous detection of multifeeding and to prevent complicated operation.

SUMMARY

In order to resolve the above-described issues, the present disclosure provides an image reading apparatus including a reading unit that reads a document, a background plate that serves as a background of the document, and a multifeeding detecting unit that detects multifeeding of the document, and a control unit, in which the control unit is configured to cause the reading unit to read a shadow, generated at the background plate, of the document, to not determine occurrence of multifeeding when the multifeeding detecting unit detects multifeeding and a pixel value of the read shadow exceeds a predetermined threshold value, and to determine occurrence of multifeeding when the multifeeding detecting unit detects multifeeding and the pixel value of the read shadow does not exceed the predetermined threshold value.

In the configuration, the multifeeding detecting unit detects multifeeding. The control unit causes the reading unit to read the shadow, generated at the background plate, of the document. Also, the control unit does not determine occurrence of multifeeding when the multifeeding detecting unit detects multifeeding and a pixel value of the read shadow exceeds the predetermined threshold value, and determines multifeeding when the multifeeding detecting unit detects multifeeding and a pixel value of the read shadow does not exceed the predetermined threshold value.

As such, the pixel value of the read shadow is compared with the predetermined threshold value. A larger shadow leads to a larger pixel value of the shadow. The shadow of a thicker paper sheet becomes longer or darker. Thus, the magnitude of the pixel value of the shadow corresponds to the thickness of the document, and the control unit does not determine occurrence of multifeeding when the thickness of the document is large, even when the multifeeding detecting unit detects multifeeding.

As described above, it is not determined as multifeeding, when the thickness of the document is large, thus an erroneous detection of multifeeding is not performed when reading thick paper, which makes it possible to correctly read the document that is to be read.

DESCRIPTION OF EXEMPLARY EMBODIMENTS

Embodiments of the present disclosure will be described below with reference to the drawings.

Figure 1:
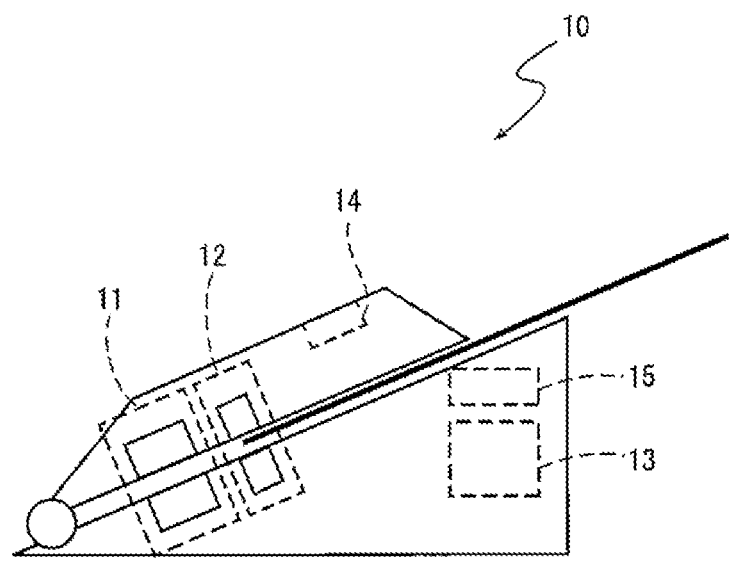
FIG. 1 is a schematic configurational view of an image reading apparatus according to one example of the present disclosure.
Figure 2:
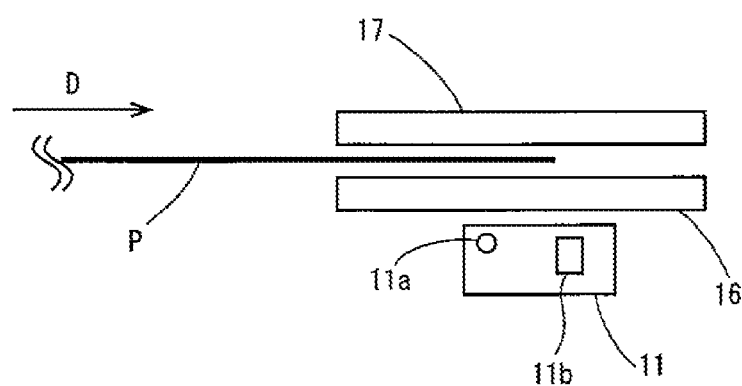
FIG. 2 is a schematic diagram of a reading unit.

FIG. 1 illustrates, in a schematic configuration, a view of an image reading apparatus according to one embodiment of the present disclosure, and FIG. 2 illustrates, in a schematic form, a view of a reading unit.

An image reading apparatus 10 includes a reading unit 11 that reads an document, a multifeeding detecting unit 12, and a control unit 13. The reading unit 11 includes a transparent member 16 and a background plate 17 that face each other, where a document P transported along a transport direction D is transported while clamped therebetween. The transparent member 16 is formed of glass, as one example. The reading unit 11 is disposed on an opposite side of the transparent member 16 from the side on which the background plate 17 is present. The background plate 17 is a member in a predetermined color, for example, a gray color having a predetermined concentration, and is irradiated by a light source 11a included in the reading unit 11. The reading unit 11 performs reading when an image capturing element (also referred to as a reading element) 11b facing the document receives reflected light of light irradiated from the light source 11a (reflected light from the background plate 17 or the document P).

An image capturing element 11b is a line sensor by a plurality of image capturing elements (pixels) aligned along a direction orthogonal to the transport direction D (the direction perpendicular to the plane of paper in FIG. 2), where the line sensor reads an image of a single line by a reading operation at one time. The reading unit 11 repeatedly performs reading for a single line at a predetermined frequency to obtain a result of reading of two dimensions, that is, the entire plane of the document P. FIG. 2 illustrates a configuration for reading one plane (the plane facing downward in FIG. 2) of the document P, and it goes without saying that the image reading apparatus 10 may be a both-planes simultaneous readable scanner also having a configuration for reading the other plane (the plane facing upward in FIG. 2) of the document P.

Here, the light source 11a is located upstream of the image capturing element 11b with respect to the transport direction D, and the irradiation light from the light source 11a causes a shadow to be generated downstream of the leading end of the document P. The length of the shadow is proportional to the thickness of the document P at an image capturing position of the image capturing element 11b. Also, there is seen a tendency that a thicker document P leads to a longer shadow and the shadow becomes thicker (darker). This is because it is presumed that the thicker the thickness of the document, the less likely light is transmitted through the document, resulting in a thicker shadow, generated at the background plate 17, of the document. The control unit 13 then specifies the pixel value of the darkest portion of the shadow of the document P. This makes it possible to measure or estimate the thickness of the document P based on the value of the pixel of the shadow of which an image is captured by the image capturing element 11b. Note that an estimation processing of the thickness based on the pixel value of the shadow is described in detail in JP 2018-195960 A.

As such, the control unit 13 is configured to compare the pixel value of the darkest portion of the shadow with a predetermined threshold value.

The multifeeding detecting unit 12 is constituted by an ultrasonic wave transmitter and an ultrasonic wave receiver that face each other with a transportation path interposed therebetween. It is determined, based on the degree of attenuation of the ultrasound wave when the document P passes between the wave transmitter and the wave receiver, whether the document that is passing is one piece or a plurality of pieces, and in case of the plurality of pieces, the detection is performed as multifeeding.

The control unit 13 controls, in addition to the reading unit 11 and the multifeeding detecting unit 12, the entirety of the image reading apparatus 10 including a display unit 14 and a paper discharging unit 15. The display unit 14 also serves as an operation unit of touch panel type, and the paper discharging unit 15 also serves as a transport unit that transports the document P.

Figure 3:
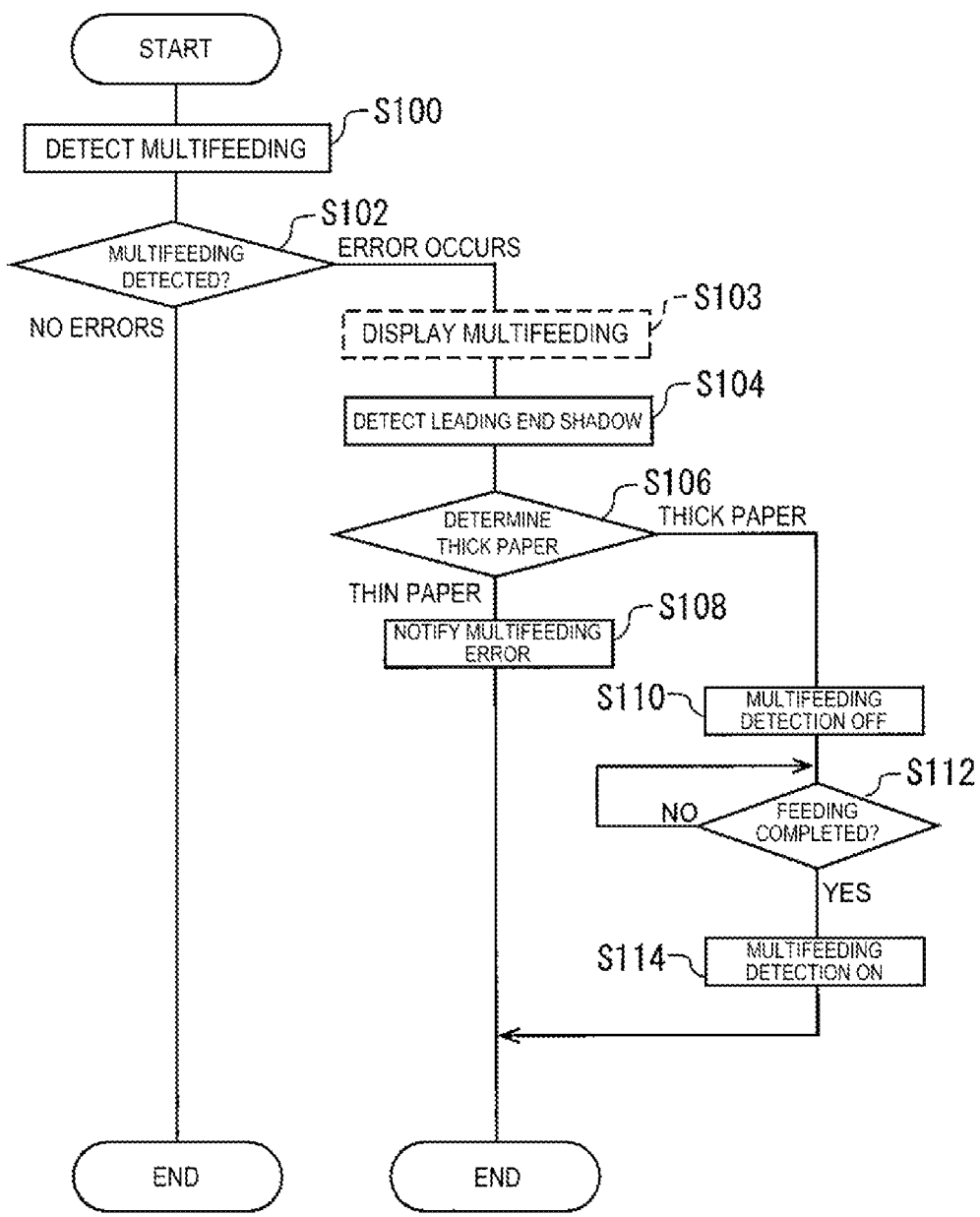
FIG. 3 is a flowchart illustrating a read processing of an image reading apparatus.

FIG. 3 illustrates, by flowchart, a read processing of an image reading apparatus. In the following, in the image read processing of the image reading apparatus, a processing in the case of multifeeding detection is mainly described below while referencing the flowchart.

The control unit 13 causes the multifeeding detecting unit 12 to start a detecting operation of multifeeding in step S100. The control unit 13 monitors the detection result by the multifeeding detecting unit 12, and when the multifeeding detecting unit 12 detects multifeeding, determines that an error has occurred in step S102. However, the control unit 13 performs detecting a leading end shadow in step S104 rather than immediately determining occurrence of multifeeding at this time point. The detection of the leading end shadow is a processing for determining the thickness of the document P based on the pixel value of the shadow, generated at the leading end of the document P, detected by the reading unit 11.

The reading unit 11 is configured to capture an image of a shadow generated at the leading end of the document P, and the control unit 13 estimates, based on the pixel value of the shadow, the thickness of the document P. The control unit 13, when the thickness is obtained, compares the thickness with the predetermined threshold value and determines the document P as thin paper when the thickness is smaller than the threshold value and as thick paper when the thickness is larger than the threshold value. Then, in the thick paper determination in step S106, the control unit 13, when determined as thin paper, determines as a multifeeding error again in step S108 and causes the display unit 14 to display as such. The control unit 13, when determining occurrence of multifeeding error, stop the transportation at this time point and causes the user to remove the multifeeding state and waits for the resumption of the reading. As such, the control unit 13 includes, in this example, the display unit 14, and displays, when determining occurrence of multifeeding, the event that the multifeeding has occurred. Note that the display may be performed when multifeeding is detected in step S102 (step S103).

In contrast, the control unit 13, when determined as thick paper in step S106, turns the multifeeding detection to OFF in step S110. That is, although it is determined as multifeeding in step S102, the multifeeding detection is turned to OFF to ignore this determination in step S110, stands by until the feeding is completed in step S112, and upon completion, returns the multifeeding detection to ON in step S114.

In this example, although the multifeeding detection is turned to ON upon completion of the feeding of the document for which multifeeding is detected, and the multifeeding detection may be turned to ON when the next document is supplied.

Figure 5:
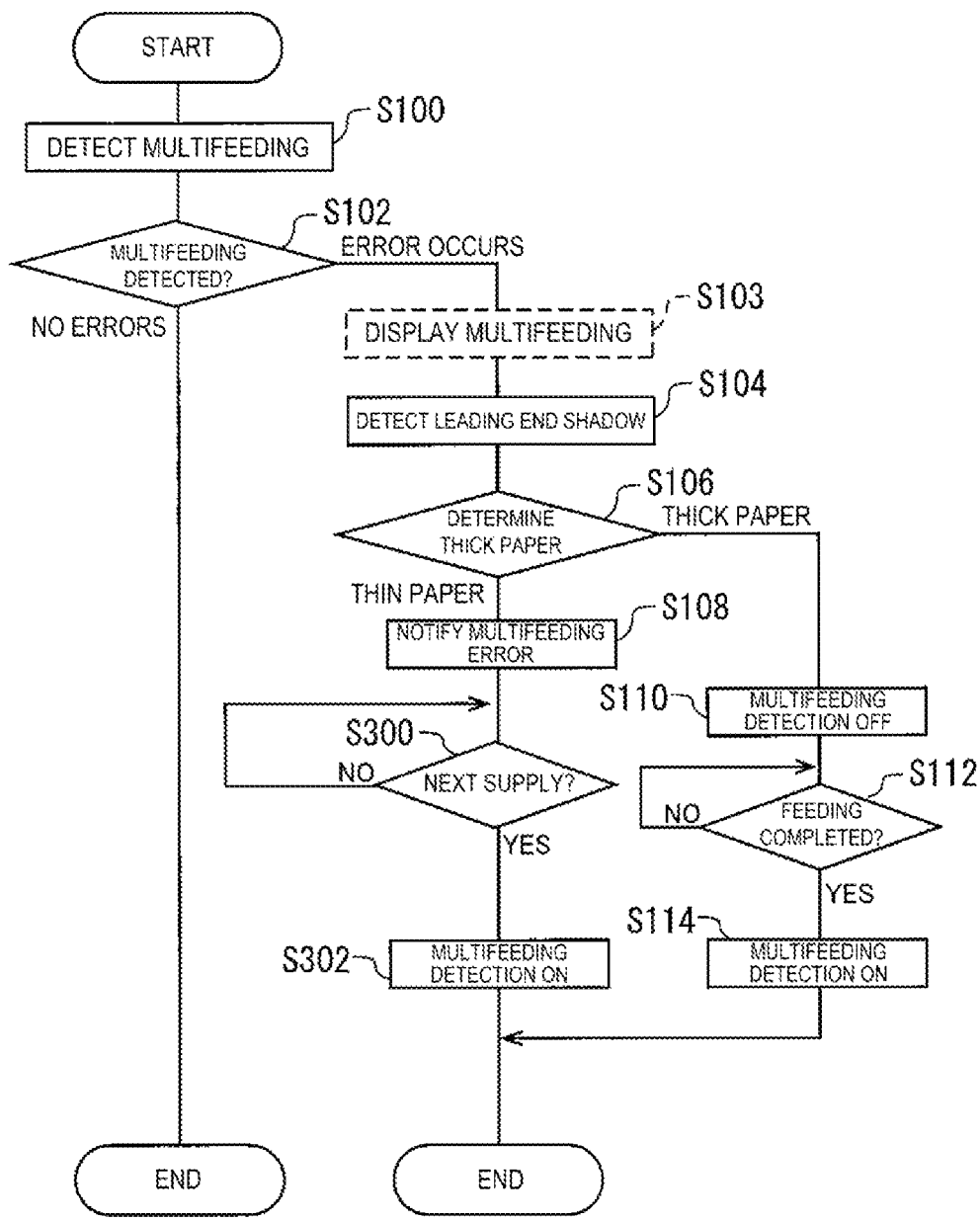
FIG. 5 is a flowchart of a read processing of an image reading apparatus according to a modified example.

FIG. 5 is a flowchart of a read processing of an image reading apparatus according to a modified example.

In this example, the control unit 13, when the multifeeding detecting unit 12 detects multifeeding during continuous paper supply (step S102) and the pixel value of the read shadow does not exceed the predetermined threshold value (step S106: determining thin paper), determines multifeeding (step S108). Then the control unit 13 causes the next document to be supplied in step S300, and upon completion of the supply, starts with turning the multifeeding detection by the multifeeding detecting unit 12 to ON in step S302.

As such, in this example, the control unit 13 does not determine occurrence of multifeeding when the multifeeding detecting unit 12 detects multifeeding and the pixel value of the read shadow exceeds the predetermined threshold value (when determined as thick paper) (steps S102, S106, and S110), while the control unit 13 determines multifeeding when the multifeeding detecting unit 12 detects multifeeding and the pixel value of the read shadow does not exceed the predetermined threshold value (steps S102, S106, and S108).

Also, in this example, the control unit 13 performs a procedure in which the multifeeding detecting unit 12 detects multifeeding, and then the reading unit 11 reads the shadow, generated at the background plate 17, of the document.

Further, the control unit 13 is assumed to stop detecting multifeeding by the multifeeding detecting unit 12, when the pixel value of the shadow read by the reading unit 11 exceeds the predetermined threshold value.

However, it is also possible to perform determining thick paper before the multifeeding detection. In this case, the multifeeding detecting unit 12 is located downstream of the reading unit 11.

Figure 4:
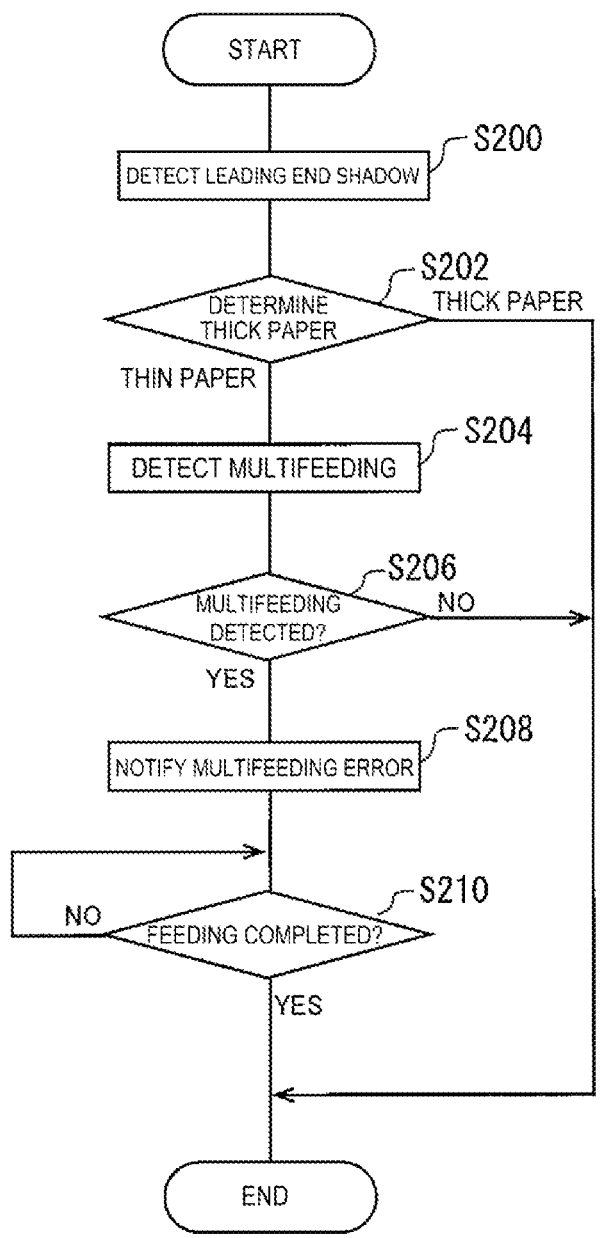
FIG. 4 is a flowchart of a read processing of an image reading apparatus according to a modified example.

FIG. 4 illustrates, by flowchart, a read processing of an image reading apparatus according to the modified example. In this example, the processing of the detection of the leading end shadow performed in step S104 is performed in step S200. The thick paper determination performed in step S106 is performed in step S202. When being thick paper, the determination result of the multifeeding detection at the multifeeding detecting unit 12 is substantially ignored, and thus the processing of the multifeeding detection is terminated.

In contrast, the control unit 13, when determined as thin paper by the thick paper determination in step S202, starts, in step S204, the multifeeding detection of step S100, and performs, in step S206, a determination of the multifeeding detection of step S102. The control unit 13 waits for the result of the multifeeding detection by the multifeeding detecting unit 12, and when multifeeding detection is not performed, the processing of the multifeeding detection is terminated. In contrast, the control unit 13, when multifeeding is detected, performs, in step S208, the multifeeding error notification performed in step S108, and waits for, in step S210, the completion of the feeding performed in step S112, and the processing of the multifeeding detection is terminated.

As such, in the embodiment, the control unit 13 causes the reading unit 11 to read the shadow, generated at the background plate 17, of the document P, and when the pixel value of the shadow does not exceed the predetermined threshold value (determining thin paper), determines multifeeding when the multifeeding detecting unit 12 detects multifeeding. In contrast, when the pixel value of the shadow exceeds the predetermined threshold value (determining thick paper), it is not determined as multifeeding even when the multifeeding detecting unit 12 detects multifeeding. In this example, the control unit 13 does not acquire the detection result from the multifeeding detecting unit 12, and thus it is not determined as multifeeding even when the multifeeding detecting unit 12 substantially detects multifeeding.

Figure 6:
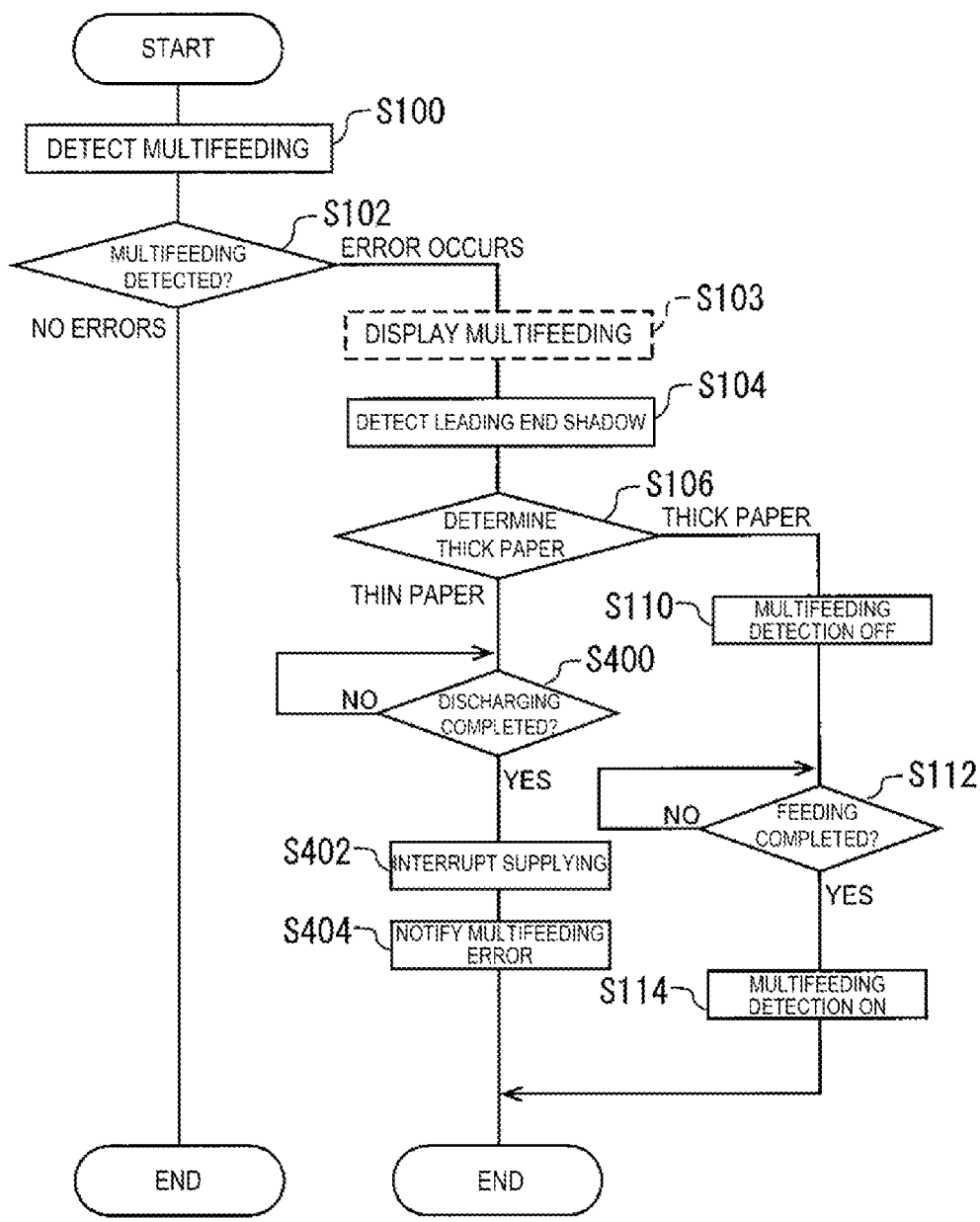
FIG. 6 is a flowchart of a read processing of an image reading apparatus according to a modified example.

FIG. 6 is a flowchart of a read processing of an image reading apparatus according to an modified example.

As an example in the case of continuous paper supply, the control unit 13, upon determining occurrence of multifeeding during the continuous paper supply, causes the paper discharging unit 15 to discharge the multifed document, and interrupts supplying before the next document is supplied. The control unit 13, when it is determined as thin paper in step S106 after the multifeeding is detected, waits for a completion of the discharging the document by the paper discharging unit 15 in step S400, and upon discharging of the document, interrupts supplying in step S402 and notifies the multifeeding detection in step S404, for example.

Note that although the feeding or paper discharging is completed when detecting multifeeding thus far, the control unit 13, upon determining occurrence of multifeeding, may interrupt transport of the document P.

FIG. 7 is a schematic diagram illustrating an improvement of a read processing of the present disclosure.

Figure 7A:
FIG. 7A is a schematic diagram illustrating a target to be read.

It is assumed, in the continuous paper supply, that the first and second sheets are plain paper, the third sheet is a plastic card, and the fourth sheet is plain paper, as illustrated in FIG. 7A.

Figure 7B:
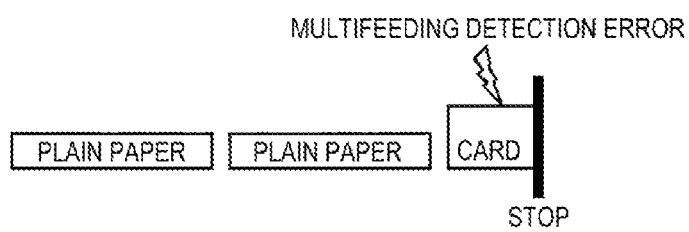
FIG. 7B is a schematic diagram illustrating a read processing in the related art.

In the case of an image reading apparatus in the related art, the reading of the first and second sheets of plain paper is completed without any trouble, and the supplying of the third sheet of the plastic card is started, as illustrated in FIG. 7B. However, multifeeding is detected in the middle of the reading of the card, the reading and supplying are both interrupted, and then one job of the continuous paper supply is stopped.

Figure 7C:
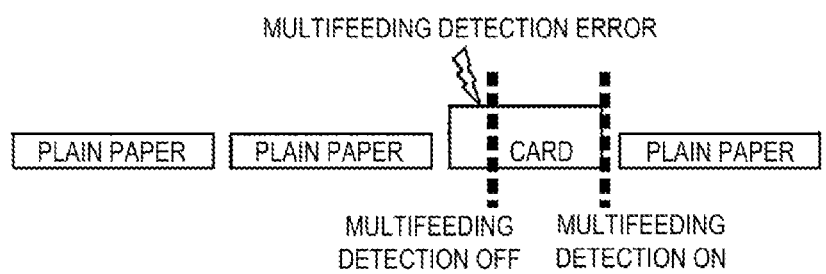
FIG. 7C is a schematic diagram illustrating a read processing according to the embodiment.

In contrast, according to the present disclosure, it is the same that the reading of the first and second sheets of plain paper is terminated without any trouble, as illustrated in FIG. 7C. Then, when the supplying of the third sheet of the plastic card is started, even though the multifeeding detecting unit 12 detects multifeeding, the multifeeding detection is turned to OFF because of the determination that the document is thick paper, and the processing is not performed as multifeeding. The multifeeding detection is then returned to ON upon completing the feeding. Then, the supplying of the fourth sheet of plain paper is also started, and the reading is completed due to the lack of the multifeeding detection. As such, one job in which the continuous paper supply is performed can be completed until the end.

Features of Present Disclosure

1 Notification Timing for Multifeeding Detection

The timing for notifying the multifeeding detection are cases of stopping immediately after detecting and after discharging, and either of the timings can be addressed in the present disclosure. In case of determining the shape of a paper sheet by an image in the known Example, the stopping cannot be performed immediately after the multifeeding is detected.

2 Difference by Multifeeding Detection Pattern

According to the known art, the determination is done by an accumulation of multifeeding levels when multifeeding is detected. It is disclosed that it can be thus determined whether it is thick paper or plain paper by the continuity of the detection levels. However, the method for determining by the thickness of paper sheet as is has an advantage because the continuous multifeeding levels are not necessarily obtained depending on the materials or conditions.

3 Processing at Leading End and at Middle of Paper

The present disclosure basically performs detection at the leading end of a paper sheet. In contrast, it is also conceivable of a case of transporting a paper sheet to which a photograph of thick paper or the like is affixed. Even when a detection is performed in the middle of the paper sheet as such, a shadow is generated at the document P being transported rather than the background plate 17, which enables a detection in a similar manner. That is, even when the multifeeding detection is performed in the middle of the document, the thickness of the paper sheet can be detected, which makes it possible, in case of thick paper, to not perform the processing as the multifeeding detection.

As such, it is possible to prevent an erroneous detection of the multifeeding detection not only when a card is mixedly loaded, but also when a photograph is affixed to plain paper and for a paper sheet to which a seal of thick paper or the like is affixed.

4 In Case of Carrier Sheet

In order to detect a carrier sheet when making use of the carrier sheet, a pattern detection is typically performed using a through-beam sensor. However, when a thickness estimation can be performed as in the present disclosure, a detection of the carrier sheet can be performed by multifeeding pattern by combination of the thickness estimation of a paper sheet and the multifeeding detection. This makes it possible to omit a detection mechanism using a known through-beam sensor.

As a modified example other than the above modified example, the multifeeding detection by the multifeeding detecting unit may not be performed when accepting an operation specifying the thickness of the document and the accepted thickness corresponds to thick paper.

Such an imaging apparatus includes a reading unit that reads a document, a background plate serving as a background of the document, a multifeeding detecting unit that detects the multifeeding of the document, an operation unit that accepts a setting operation, and a control unit. The control unit then causes the reading unit to read a shadow, generated at the background plate, of the document. Also, the control unit does not perform the multifeeding detection by the multifeeding detecting unit when the control unit accepts, by the operation unit, the operation specifying the thickness of the document and the accepted thickness corresponds to thick paper. Note that the operation unit is materialized by the display unit 14 of touch panel type.

Note that the present disclosure is not limited to the above-described examples. It goes without saying for a person of ordinary skill in the art, Applying mutually replaceable members, configurations, and the like disclosed in the above-described examples by appropriately changing the combination thereof, Although not disclosed in the above-described examples, appropriately replacing members, configurations, and the like that are mutually replaceable with the members, configurations, and the like that are the known technologies and disclosed in the above-described examples, and applying by changing the combination thereof, Although not disclosed in the above-described examples, a person skilled in the art appropriately replaces, based on the known technologies, members and configurations, and the like with members and configurations, and the like that are conceivable as substitutes for the members and configurations, and the like disclosed in the above-described examples, and applying by changing the combination thereof, are disclosed as one example of the present disclosure.

Also, the image reading apparatus undergoes a plurality of steps in the processing course, thus it is possible to perceive the image reading apparatus as a method as a concept of the disclosure. Thus, an image reading method is also disclosed.

What is claimed is:

1. An image reading apparatus, comprising:
   a reading unit that reads a document;
   a background plate that serves as a background of the document; and
   a multifeeding detecting unit that detects multifeeding of the document, and
   a control unit, wherein
   the control unit is configured to cause the reading unit to read a shadow, generated at the background plate, of the document, and
   the control unit is configured to not determine occurrence of multifeeding when the multifeeding detecting unit detects multifeeding and a pixel value of the read shadow exceeds a predetermined threshold value, and
   to determine occurrence of multifeeding when the multifeeding detecting unit detects multifeeding and the pixel value of the read shadow does not exceed the predetermined threshold value.

2. The image reading apparatus according to claim 1, wherein
   the control unit is configured to compare a pixel value of a darkest portion of the shadow with the predetermined threshold value.

3. The image reading apparatus according to claim 1, wherein
   the control unit is configured to cause the reading unit to read the shadow, generated at the background plate, of the document after the multifeeding detecting unit detects multifeeding.

4. The image reading apparatus according to claim 1, wherein
   the control unit is configured to cause the reading unit to read the shadow, generated at the background plate, of the document,
   when the pixel value of the shadow exceeds the predetermined threshold value, to not determine occurrence of multifeeding even when the multifeeding detecting unit detects multifeeding, and
   when the pixel value of the shadow does not exceed the predetermined threshold value, to determine occurrence of multifeeding when the multifeeding detecting unit detects multifeeding.

5. The image reading apparatus according to claim 1, comprising a display unit, wherein
   the control unit is configured, when determining occurrence of multifeeding, to indicate occurrence of multifeeding.

6. The image reading apparatus according to claim 1, wherein
   the control unit is configured to stop detecting multifeeding by the multifeeding detecting unit, when the pixel value of the shadow read by the reading unit exceeds a predetermined threshold value.

7. The image reading apparatus according to claim 1, wherein
   the control unit is configured, during continuous paper supply, to determine occurrence of multifeeding when the multifeeding detecting unit detects multifeeding and the pixel value of the read shadow does not exceed the predetermined threshold value, and to then start multifeeding detection by the multifeeding detecting unit when a next document is supplied.

8. The image reading apparatus according to claim 1, wherein the reading unit is configured to cause a reading element facing a document to read, as a pixel value, an image of a shadow generated at a leading end of the document, and the control unit is configured to estimate a thickness of the document based on a pixel value of a darkest portion of the shadow.

9. The image reading apparatus according to claim 1, comprising a paper discharging unit, wherein the control unit is configured, upon determining occurrence of multifeeding during continuous paper supply, to cause the paper discharging unit to discharge a multifed document, and to interrupt paper supply before a next document is supplied.

10. The image reading apparatus according to claim 1, wherein the control unit is configured, upon determining occurrence of multifeeding, to interrupt transport of the document.

11. An image reading apparatus, comprising:

a reading unit that reads a document;

a background plate that serves as a background of the document;

a multifeeding detecting unit that detects multifeeding of the document;

an operation unit that accepts a setting operation, and a control unit, wherein the control unit is configured to cause the reading unit to read a shadow, generated at the background plate, of the document, to accept, by the operation unit, an operation specifying a thickness of the document, and to not perform multifeeding detection by the multifeeding detecting unit when an accepted thickness corresponds to thick paper.

12. An image reading method of an image reading apparatus including a reading unit that reads a document, a background plate that serves as a background of the document; and a multifeeding detecting unit that detects multifeeding of the document, and a control unit, wherein the method comprising:

causing the reading unit to read a shadow, generated at the background plate, of the document;

not determining occurrence of multifeeding when the multifeeding detecting unit detects multifeeding and a pixel value of the read shadow exceeds a predetermined threshold value, and determining occurrence of multifeeding when the multifeeding detecting unit detects multifeeding and the pixel value of the read shadow does not exceed the predetermined threshold value.

13. An image reading method of an image reading apparatus comprising a reading unit that reads a document;

a background plate that serves as a background of the document;

a multifeeding detecting unit that detects multifeeding of the document;

an operation unit that accepts a setting operation, and a control unit, wherein the method comprising:

causing the reading unit to read a shadow, generated at the background plate, of the document;

accepting, by the operation unit, an operation specifying a thickness of the document, and stopping detecting multifeeding by the multifeeding detecting unit when an accepted thickness corresponds to thick paper.

* * * * *